US008854412B2

(12) United States Patent
Tian et al.

(10) Patent No.: US 8,854,412 B2
(45) Date of Patent: Oct. 7, 2014

(54) REAL-TIME AUTOMATIC SCENE RELIGHTING IN VIDEO CONFERENCE SESSIONS

(71) Applicant: Cisco Technology, Inc., San Jose, CA (US)

(72) Inventors: Dihong Tian, San Jose, CA (US); J. William Mauchly, Berwyn, PA (US); Joseph T. Friel, Ardmore, PA (US)

(73) Assignee: Cisco Technology, Inc., San Jose, CA (US)

( * ) Notice: Subject to any disclaimer, the term of this patent is extended or adjusted under 35 U.S.C. 154(b) by 201 days.

(21) Appl. No.: 13/624,058

(22) Filed: Sep. 21, 2012

(65) Prior Publication Data

US 2014/0085398 A1 Mar. 27, 2014

(51) Int. Cl.
*H04N 7/14* (2006.01)
(52) U.S. Cl.
USPC .................................................. 348/14.01
(58) Field of Classification Search
USPC .......................................... 348/14.01–14.08
See application file for complete search history.

(56) References Cited

U.S. PATENT DOCUMENTS

| 8,665,258 B2 * | 3/2014 | Diverdi et al. ................ 345/419 |
| 2013/0127823 A1 * | 5/2013 | Diverdi et al. ................ 345/419 |

OTHER PUBLICATIONS

Cuizhu Shi et al., "Automatic Image Quality Improvement for Videoconferencing," ICASSP '04, vol. 3, pp. iii-701-4 vol. 3, May 2004.
Zicheng Liu et al., "Learning-Based Perceptual Image Quality Improvement for Video Conferencing," ICME '07, Jul. 2007.
Stephen Mangiat et al., "Automatic Scene Relighting for Video Conferencing," in ICIP'09 Proceedings of the 16th IEEE International Conference on Image Processing, pp. 2781-2784, 2009.
Marco Zuliani et al., "An Automatic Method to Learn and Transfer the Photometric Appearance of Partially Overlapping Images," IEEE ICIP, pp. 493-496, Oct. 2008.
Fredo Durand et al., "Fast Bilateral Filtering for the Display of High-Dynamic-Range Images," ACM Trans. on Graphics 21 (2002) Proc. of SIGGRAPH conference.
Paul E. Debevec et al., "Recovering High Dynamic Range Radiance Maps from Photographs," SIGGRAPH '08, New York, NY, USA, 2008, pp. 1-10, ACM.
Erik Reinhard et al., "Photographic Tone Reproduction for Digital Images," ACM Trans. Graph., vol. 21, No. 3, pp. 267-276, 2002.

* cited by examiner

*Primary Examiner* — Mohammad Islam
(74) *Attorney, Agent, or Firm* — Edell, Shapiro & Finnan, LLC (57) ABSTRACT

Video frames are captured at one or more cameras during a video conference session, where each video frame includes a digital image with a plurality of pixels. Depth values associated with each pixel are determined in at least one video frame, where each depth value represents a distance of a portion of the digital image represented by at least one corresponding pixel from the one or more cameras that capture the at least one video frame. Luminance values of pixels are adjusted within captured video frames based upon the depth values determined for the pixels so as to achieve relighting of the video frames as the video frames are displayed during the video conference session.

20 Claims, 5 Drawing Sheets

REAL-TIME AUTOMATIC SCENE RELIGHTING IN VIDEO CONFERENCE SESSIONS

TECHNICAL FIELD

The present disclosure relates to video conference sessions, particularly video conferencing in Telepresence environments, and improving perceptual quality of video images under insufficient lighting conditions.

BACKGROUND

Video conference sessions, such as sessions within immersive Telepresence (TP) environments, are carefully designed to provide maximum and clear eye contact between local and remote participants. In certain TP systems, a lighting fixture is provided behind one or more display screens within a video conferencing room that ensures there is sufficient ambient lighting for participants in the front row of the conference room. While the lighting fixture provides a suitable level of lighting for certain scenarios, it can also be desirable at times to remove the lighting fixture from the room while maintaining the same level of perceptual quality and eye contact for a video conference session. This may be achieved by automatic scene relighting, where the term "relighting" stands for transformation of pixels in images through digital signal processing technique.

Automatic scene relighting for improving image quality can be accomplished utilizing certain known techniques. However, challenges remain for applying scene relighting on video in real time. For example, one example technique generates a skin color model and a global exposure correction is then applied using this model to detected skin tone areas within each video frame of a video conference session. However, this technique can also result in applying exposure correction to non-skin tone areas within frames (since the model is based solely upon a skin color model).

A better approach utilizes photometric mapping that is learned offline (e.g., utilizing snapshots of the video frames at different exposures), which transforms a low exposure image toward a high dynamic range (HDR) tone-mapped image. The learned photometric mapping is applied thereafter on every video frame to transform each video image into a new image with higher perceptual quality. However, this approach implicitly assumes that lighting in a scene is fixed and object motion does not cause photometric variation. This assumption does not work well in a dynamic environment such as a video conference session in a TP room, where the actual lighting in the room can vary over time and object motion can cause photometric variations. As a result, a photometric mapping learned from calibration of still images may not result in good image quality with changing scenes.

In addition, the use of only an HDR based correction for lighting, either by photometric mapping or using other techniques, may be insufficient to present high perceptual quality and maximum eye contact within TP video conferencing sessions, due to the directional lighting associated with a scene. For example, overhead lighting, typical in a conference room, can create shadows under the eyes, nose, and cheeks of participants within the room which would remain in the HDR processed image and degrade the immersive experience that can otherwise be provided today in TP rooms that utilize a lighting fixture.

DESCRIPTION OF EXAMPLE EMBODIMENTS

Overview

Video frames are captured at one or more cameras during a video conference session, where each video frame comprises a digital image comprising a plurality of pixels. Depth values associated with each pixel are determined in at least one video frame, where each depth value represents a distance of a portion of the digital image represented by at least one corresponding pixel from the one or more cameras that capture the at least one video frame. Pixels can be grouped according to the depth values and the lowest and highest luminance values for each group of pixels can be determined. Based on the depth values (and, optionally, also based upon the lowest and highest luminance values determined for the pixels), luminance values of pixels within captured video frames are adjusted so as to achieve relighting of the video frames as the video frames are displayed during the video conference session.

Example Embodiments

Telepresence (TP) video conferencing systems are configured to provide one or more users or conference participants at one endpoint with a feeling or experience of being immersed in the presence of other participants at other endpoints within the TP video conference, when in fact the participants are located at remote endpoints. One issue associated with video conference sessions is that the lighting conditions may be less than ideal, where underexposed or overexposed areas within video frames can result in shadows or overly bright spots that may diminish the TP experience to a participant viewing video content from the conference session. As previously noted, certain techniques are known to present lighting (e.g., front lighting for the participants in the foreground or front part of the room that is being video recorded) in order to enhance the lighting within a video presentation of the participants in the room for one or more participants at remote endpoint locations. Those techniques include the provision of actual light fixtures at strategic positions within a TP video conference room, and simulated lighting or relighting by processing of digital pixels associated with video frames so as to lighten or increase the luminance values of one or more pixels (e.g., blocks of pixels) within video frames associated with the video conference session.

The techniques described herein provide a relighting of pixels within video frames of a video conference session based upon a determined depth of pixels and current luminance values of the pixels within the video frames, where pixels that are determined to be closest to the foreground (i.e., having a smaller determined depth value) within a video frame are lightened by a greater extent toward the highest luminance value of those pixels in relation to pixels determined to be further away from the foreground (i.e., having a greater determined depth value). Optionally, photometric mapping can first be applied to one or more video frames associated with the video conference session to reduce undesired exposures or minimize differences in exposure values between pixels (or blocks of pixels) so as to transform each video frame to a high dynamic range (HDR) tone mapped image, followed by performing depth-based illumination adjustments to each HDR tone mapped image.

Figure 1:
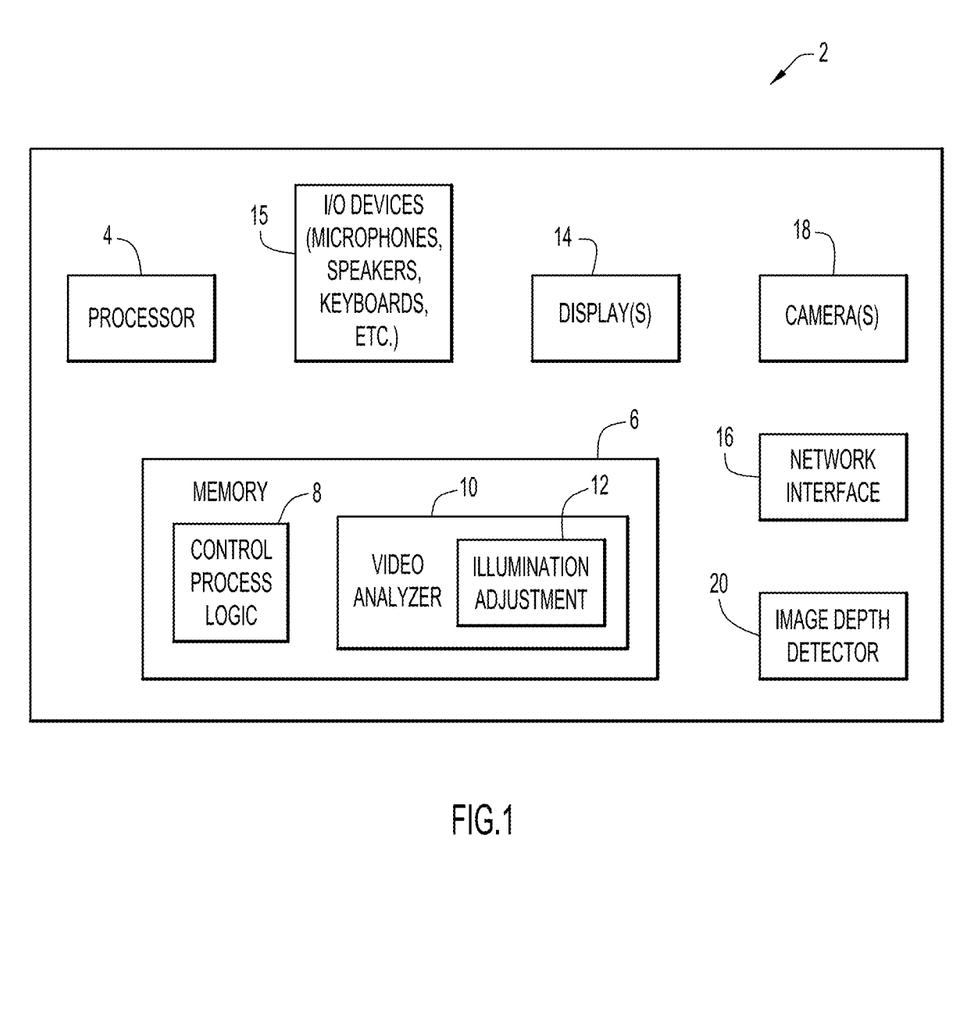
FIG. 1 is a schematic block diagram of an example Telepresence (TP) video conference system utilized in a TP environment to engage in video conference sessions with other TP endpoints within a network.

An example embodiment of a system that performs the techniques of depth-based illumination adjustments of pixels for video frames associated with a video conference session is depicted in FIG. 1. The system 2 comprises one or more computing devices including at least one processor 4, at least one memory 6, at least one network interface 16, and one or more displays 14 to display video content for the video conference session (e.g., video images of participants at one or more different endpoints that are engaged in the video conference session). The displays can be any suitable display panels or display screens 9 (e.g., LCD displays or any other suitable types of display panels). One or more cameras 18 are provided to capture video content of one or more participants within the video conference room for the system 2. The video camera(s) capture video images in at least two different exposure times, including a short exposure time and a long exposure time. For example, a stereo camera can be provided to capture the same image at different exposures and during the same time period. The system 2 can also include any other suitable input and/or output devices (as generally indicated by I/O devices 15) including, without limitation, one or more microphones (e.g., to capture audio content for a video conferencing session), one or more speakers, one or more keyboards (to facilitate input of data to a computing device of the system), touch screens, track pads, remote control devices, etc., where each of the I/O devices can be integrated as part of a computing device or connected as a peripheral device to the computing device.

The network interface 16 can comprise, for example, one or more of an Ethernet interface card or switch, a modem, a router or any other suitable hardware device that facilitates a wireless and/or hardwire connection with the system 2 over a network with one or more endpoints, servers and/or any other devices associated with a video conference session, where the network interface can be integrated within a computing device of the system 2 or a peripheral that connects with the computing device.

The memory 6 can be implemented by any conventional or other one or more memory or storage devices, and may include any suitable storage capacity. For example, the memory 6 may comprise read only memory (ROM), random access memory (RAM), erasable programmable read-only memory (EPROM), magnetic disk storage media devices, optical storage media devices, flash memory devices, electrical, optical, or other physical/tangible memory storage devices. Memory 6 comprises one or more computer readable storage media (e.g., a memory device) encoded with software comprising computer executable instructions as described herein such that, when the software is executed by processor(s) 4, it is operable to capture and provide video content (as well as audio content and/or other types of data content), via the network interface 16, to other endpoint devices associated with a video conference session as well as perform other processing operations for relighting of video frames within the video content according to the techniques described herein.

The processor(s) 4 comprise one or more microprocessors that execute control process logic instructions (generally depicted as instructions 8) stored within memory 6, including operational instructions and software applications stored within such memory. In particular, the memory 6 includes a video analyzer module 10 that includes one or more software applications that analyze video frames of content captured by camera(s) 18 and process the video frames for use within the video conference session. For example, the video analyzer module 10 can include a codec module to encode and/or decode video frames for transmission to other endpoints associated with the conference session. The video analyzer module further includes an illumination adjustment module 12 including one or more software applications that process the video frames captured by camera(s) 18 to adjust the luminance levels for pixels within the video frames based upon the techniques described herein.

The system 2, which performs the illumination adjustment techniques on video frames captured by one or more cameras (such as camera(s) 18), can be implemented as an endpoint for a video conference session and/or at one or more servers that host operations for the video conference session. For example, the system 2 can be implemented at an endpoint, where video content that is captured by camera(s) 18 at the system are processed by the video analyzer module 10 and illumination module 12 so as to adjust luminance values for pixels within video frames of the video content prior to transmission of the video frames in a media stream (e.g., a data stream including video content, audio content and/or any other data content associated with the video conference session). Alternatively, the system 2 can be implemented at the endpoint, where the endpoint receives one or more media streams from one or more other endpoints and processes the media streams, including adjusting luminance values for pixels within video frames of the received media streams prior to display at the display(s) 14 of the system. In a further embodiment, the system 2 can comprise a host server for the video conference session that processes video frames received from one or more endpoints, including adjusting luminance values of the video frames, prior to transmission of the processed video frames in media streams to other endpoints associated with the conference session. Thus, the illumination adjustment of pixels within video frames can be performed at the endpoint that captures video content, at a host server and/or at other endpoints that receive the video content.

The system 2 further includes an image depth detector 20 that identifies a depth or distance of portions of a captured image (identified by pixels or groups of pixels within the captured image) from a camera that captures the image. For example, for a captured image that includes participants or other objects within a conference room, the image depth detector 20 determines which participants or objects (as well as portions of the participants and objects) are in the foreground or closer in distance (i.e., having a shorter depth) in relation to the camera in relation to other participants or objects which may be in the background or further in distance (i.e., having a greater depth) in relation to the camera. The image depth detector 20 can comprise, e.g., a depth-sensing video camera, such as a time-of-flight (ToF) camera, where a camera (such as any camera 18 of system 2) includes one or more infrared or other suitable optical sensors to determine depth within areas of an image or video frame based upon the known speed of light. Each infrared sensor emits infrared pulses and measures the reflectance using fast shutters, allowing the infrared sensor to detect distances of objects within certain distances to the camera regardless of the lighting condition. A non-limiting example of a ToF camera that can be utilized to determine depth information within captured video frames is a DepthSense™ camera (SoftKinetic™).

The depth-sensing video camera can be configured with any suitable number of infrared sensors that facilitates depth detection at any defined area of pixels within each captured video frame. The depth detection information for pixels within defined areas or pixel blocks of a video frame facilitates a mapping of depth values to pixels or defined pixel blocks (e.g., where a pixel block is defined as an area of N×M pixels within the video frame), such that each pixel or defined pixel block within a video frame can be assigned a depth value. Further, the video analyzer module 10 can utilize the depth value information from the image depth detector 20 to define depth planes to pixels or pixel blocks within captured video frames, where pixels (or pixel blocks) having the same or similar depth values are defined to be within the same depth plane of the image. The depth information provided for a video frame is utilized to adjust luminance values of the pixels according to the techniques described herein.

Figure 2:
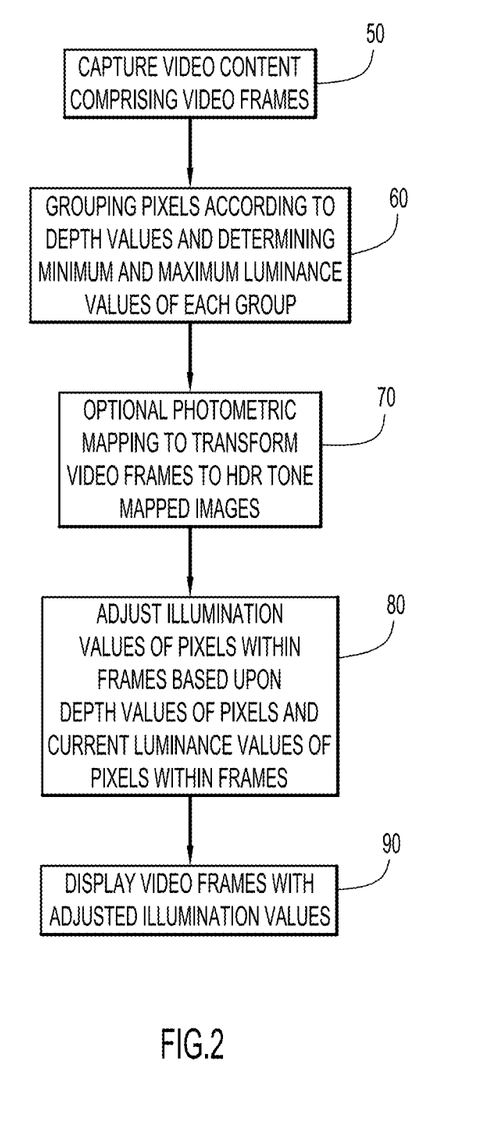
FIG. 2 is a flowchart depicting an example embodiment of a technique for providing automated relighting within video frames of a video conference utilizing the system of FIG. 1.

Operation of the system 2 is now described with reference to FIGS. 2 and 3. At 50, video content is captured by camera(s) 18, e.g., during a video conference session. At 60, the image depth detector 20 (e.g., a ToF camera) associated with the camera(s) 18 determines and maps or groups depth values for pixels (e.g., for individual pixels and/or defined pixel blocks) within one or more video frames captured by the camera(s) 18. The minimum and maximum luminance values for pixels within each group are also determined at 60. In an example embodiment, in which a segment of video frames for a conference session may remain relatively static with only small changes (e.g., video frames of a conference room in which one or more speakers are in the foreground of a captured image, with other participants located at different depths from the speaker in the background, and there is little or no movement of speakers/participants within such video frames), a key frame may be utilized to determine depth values of pixels/pixel blocks, and these depth values may then be applied to each of the video frames within the segment. Alternatively, any selected number (e.g., some or all) of the video frames may be analyzed individually to determine depth values for pixels/pixel blocks within each analyzed video frame.

Figure 4:
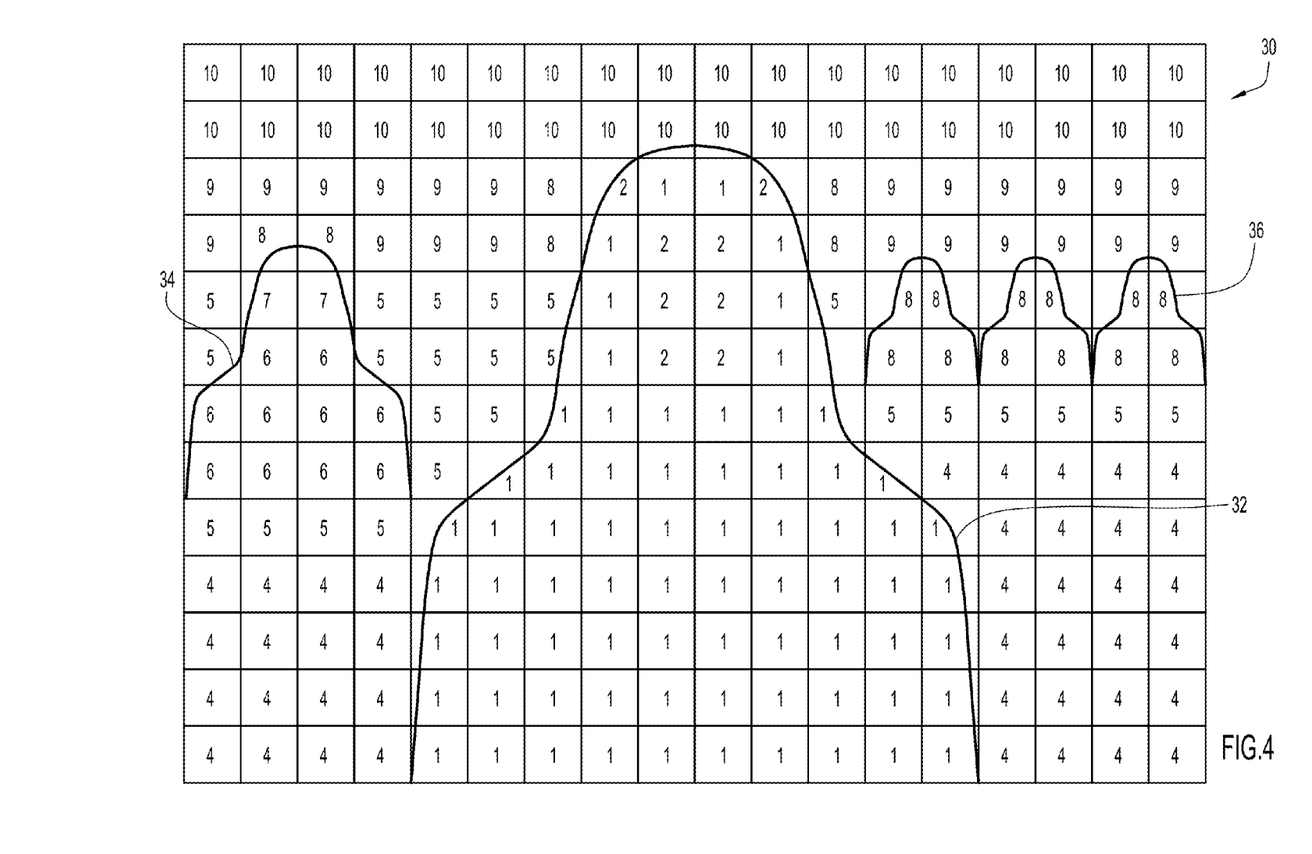
FIG. 4 depicts a view of a video frame assigning depth values to pixels or pixel blocks for performing techniques as described by the flowchart of FIG. 2.

The mapping or grouping of depth values to pixels at 60 within one or more video frames is further utilized to determine depth planes within each video frame by the video analyzer 10. An example embodiment that schematically shows how depth values are mapped to pixels or pixel blocks within a captured video frame is depicted in FIG. 4. A video frame 30 includes a participant 36 (e.g., a current speaker within a video conference) in the foreground of the video frame, with other participants 34 and 36 located at varying depths in the background (i.e., behind participant 36) within the frame. The boxes defined between row and column lines shown in the frame 30 represent pixel blocks (e.g., a defined area of N×M pixels), and the values within the pixel blocks are mapped depth values as determined by the image depth detector 20. The lower depth values (e.g., 1, 2, 3 etc.) represent objects with such pixels that are closest to the camera, whereas higher depth values (e.g., 8, 9, 10) represent objects within such pixels that are in the background or at a further depth from the camera in relation to the content in pixels having smaller depth values. While the depth values depicted for pixel blocks in FIG. 4 range from 1-10, any suitable range of depth values can be assigned (e.g., 1-100, 1-1000, etc.) depending upon the depth sensitivity required for a particular video presentation in which luminance values for pixels are to be adjusted based upon depth.

Since the participant 32 is in the foreground of frame 30 and closest to the camera(s) 18, many depth values associated with the participant are low values (e.g., 1 or 2), where the difference in depth values for the participant 32 may be due, e.g., to face contours (e.g., eye cavities would have a slightly larger depth value in relation to other contours of the participant's face, such as the participant's. forehead) or other contours of the body and/or movement of body parts (e.g., arms or hands) by the participant. Other participants 34, 36 that are behind participant 32 have associated depth values that are larger than the depth values associated with participant 32 (since such participants are at a further distance from the camera(s) 18). The pixel blocks having the same depth values are defined to be within the same depth plane.

At 70, optional photometric mapping is performed on one or more video frames by the illumination adjustment module 12 of the video analyzer 10 in order to transform video frames into high dynamic range (HDR) tone mapped images. This technique adjusts luminance values associated with pixels in a video frame to a better range prior to performing luminance adjustment based upon depth at 80. This can be performed, e.g., in scenarios in which portions of a video frame are over-exposed (e.g., too bright) or under-exposed (very dark shadows). Photometric mapping of the pixels to provide adjusted luminance values provides a more suitable starting point for further relighting adjustment based upon depth. Further, it is noted that the photometric mapping can also occur prior to the grouping of pixels (step 60) (i.e., the photometric mapping can occur right after capture of video content).

Figure 3:
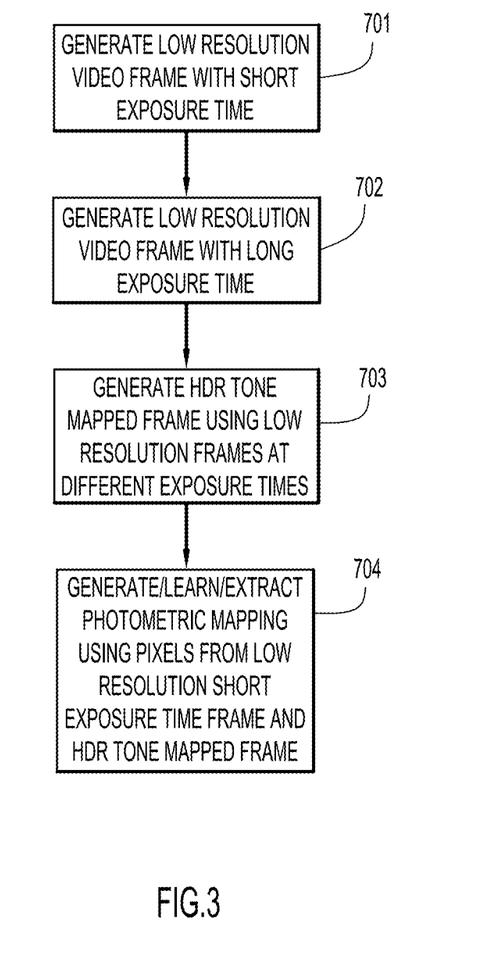
FIG. 3 is a flowchart depicting an example embodiment of a technique for generating a high dynamic range (HDR) tone mapped image for a video frame as part of the technique described by FIG. 2.

An example embodiment of performing photometric mapping of the pixels to transform a video frame into a HDR tone mapped image is depicted in the flowchart of FIG. 3. At 701 and 702, low resolution video frames at different exposure times, in particular a short exposure time and a much longer exposure time, are captured by the camera(s) 18. This can occur as part of the original capturing of video frames at 50 as described herein and depicted in the flowchart of FIG. 2. For example, camera(s) 18 may include one or more stereo cameras that are capable of capturing video images at different exposures at every time instant of a particular video conference or other video capture session. At 703, an HDR tone mapped frame is generated using both the low resolution video images captured at different exposures. The generation of an HDR tone mapped frame can be performed utilizing any conventional or other suitable technique. For example, the HDR tone mapped frame can be generated by first combining the short exposure frame with the long exposure frame to form a frame in which pixels have a higher dynamic range than a medium (e.g., a display) can accommodate. For example, the combined frame may have a dynamic range of 12 bits luminance value (i.e., 0-4095 levels) per pixel, whereas a display used in the system may only accommodate 8 bits per pixel (i.e., 0-255 levels). A tone mapping algorithm is then applied to convert the higher dynamic range back to the more limited dynamic range for proper display. Different tone mapping algorithms may be used. Some non-limiting example tone mapping algorithms that can be used are described by Frédo Durand and Julie Dorsey, "*Fast bilateral filtering for the display of high-dynamic-range images.*" SIGGRAPH '02, New York, N.Y., USA, 2002, pp. 257-265 and Erik Reinhard, Michael Stark, Peter Shirley, and James Ferwerda, "*Photographic tone reproduction for digital images,*" ACM Trans. Graph., vol. 21, no. 3, pp. 267-276, 2002, the disclosures of which are hereby incorporated by reference in their entireties. At 704, photometric mapping is then generated/learned/extracted from corresponding pixels between the low resolution low exposure video frame and the HDR tone mapped frame. Some non-limiting examples of techniques to learn photometric mapping from multiple images with different exposures are described in Paul E. Debevec and Jitendra Malik, "*Recovering high dynamic range radiance maps from photographs,*" *SIGGRAPH* '08, New York, N.Y., USA, 2008, pp. 1-10, ACM and Stephen Mangiat and Jerry Gibson, "*Automatic Scene Relighting For Video Conferencing,*" *ICIP* '09 *Proceedings of the* 16*th IEEE International Conference on Image Processing*, pp. 2781-2784, 2009, the disclosures of which are incorporated herein by reference in their entireties.

At 80, luminance values of the pixels within video frames are adjusted based upon the depth values assigned to the pixels. In particular, pixels or pixel blocks are grouped or assigned within depth planes corresponding to the depth value associated with each pixel or pixel block. For example, pixels that are within a foreground or closer to a camera which captures video frames and that have the same or similar assigned depth values (e.g., depth values of different pixels or pixel blocks differ by a small, predetermined amount) are grouped within the same depth planes. Depth planes to which pixels or pixel blocks are grouped are determined to be within the foreground of the video frames based upon having sufficiently small depth values associated with the pixels grouped within such depth planes. In other words, smaller depth values associated with pixels or pixel blocks indicate that objects or portions of objects corresponding with such pixels are closer to the camera that is capturing video images, whereas larger depth values associated with pixels or pixel blocks are further distanced from the camera and may be located within a background or behind objects corresponding with pixels/pixel blocks having smaller depth values (e.g., as depicted by participants 32, 34 and 36 in the video frame 30 of FIG. 4). Referring to FIG. 4, the pixel blocks having associated depth values that are close in value, such as depth values of 1 and 2, may be mapped or grouped within a first depth plane, while pixel blocks having associated depth values of, e.g., 3-5, may be mapped or grouped within a second depth plane, etc., where the first depth plane is closer to the camera in relation to the second depth plane, etc. Alternatively, pixel blocks having identical depth values may be mapped or grouped within the same defined depth plane (e.g., pixel blocks having associated depth values of 1 mapped or grouped within a first depth plane, pixel blocks having associated depth values of 2 mapped or grouped within a second depth plane, etc.).

Pixels or pixel blocks having the same depth values and/or mapped or grouped within the same depth plane can have their luminance values adjusted by the same factor within the luminance range as defined between the minimum and maximum luminance values determined for the depth plane, where the factor is defined based upon the depth plane. In other words, the adjustments made to pixel values within a depth plane will not result in any adjusted pixel value exceeding the maximum luminance value for the depth plane, but the amount or degree to which pixels within the depth plane can be increased will be based upon the depth value(s) associated with the depth plane. Further, pixels or pixel blocks having depth values that are small or depth planes designated as being closer to the camera or in the foreground of the image have their luminance values adjusted to a greater extent or larger amount (e.g., the luminance adjustment factor for the depth planes associated with such pixels is greater) in relation to pixel blocks having larger depth values or in depth planes designated as being further in distance from the camera. This results in an artificial front lighting or relighting of the video frames in which participants and/or other objects within the foreground of the video frames are illuminated to a greater extent in relation to other participants or objects in the background of the video frames.

Figure 5:
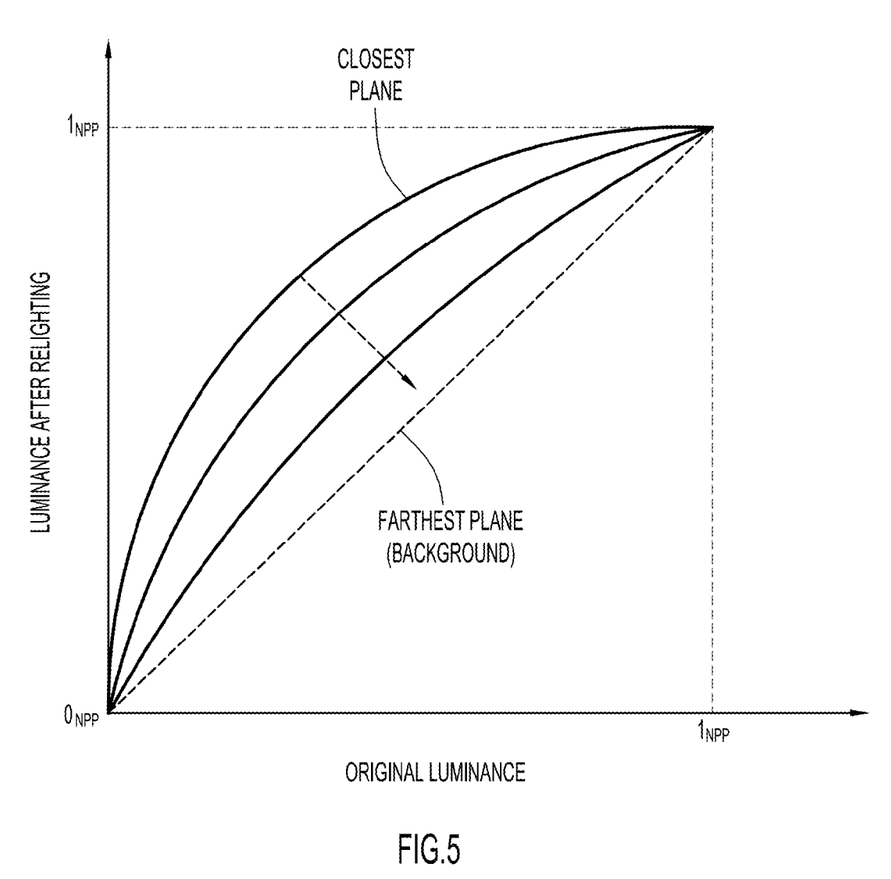
FIG. 5 depicts a normalized plot of luminance adjusted for each plane utilizing the system and techniques described herein.

The chart in FIG. 5 depicts how luminance values are adjusted for pixels within a video frame based upon a determined depth associated with the pixels and in accordance with techniques described herein. As previously noted, the minimum and maximum luminance values are determined for each group of pixels that are defined within the same depth plane, and these values are used to provide a normalized plot of the luminance values for each depth plane. The data plotted in the chart of FIG. 5 depicts how luminance values for pixels are adjusted (increased) for relighting in relation to their original luminance values and based upon the depth plane to which the pixels are grouped. The "luminance after relighting" values (represented by the Y-axis) and the "original luminance" values (represented by the X-axis) are normalized per plane, such that the greatest or maximum luminance value in each depth plane is normalized to a scale value of 1, the minimum luminance value in each depth plane is normalized to a scale value of 0, and every other luminance value in each depth plane is normalized proportionate to the greatest value. The luminance values associated with pixels that are defined in depth planes closest to the camera (i.e., considered to be in the foreground) are increased by a greater proportional amount in relation to the maximum and minimum luminance values for the associated depth planes and when compared with luminance values associated with pixels that are defined in depth planes further away from the camera (i.e., considered to be in the background), where the luminance values associated with pixels defined in the furthest depth plane are not increased at all. Thus, the pixels defined within the closest depth planes are automatically subjected to relighting that simulates a front lighting for objects within the foreground of luminance adjusted video frames.

The amount in which luminance values can be adjusted for pixels within depth frames can be set based upon any defined adjustment factors for particular depth planes, where the adjustment factors can be manually assigned (e.g., assigned based upon user observation for what level of adjustment provides the best relighting for pixels in certain depth planes) or automatically determined based upon any suitable algorithm. For example, it may be determined that luminance values for pixels within one or more depth planes that are closest to the camera are increased by as much as 10% or greater, while luminance values for pixels within depth planes further from the camera and behind the closer depth planes are increase by smaller percentages or not at all.

Thus, an automatic relighting is implemented for video frames, where relighting or adjustment of luminance values for pixels is performed based upon a determined depth of the pixels within the video frames (with optional photometric mapping of video frames to HDR tone mapped images to enhance lighting by minimizing over-exposed or under-exposed portions within video frames). The relighting performed for video frames enhances participant experience within video conference sessions, minimizing or removing shadows and dark portions associated with participants or objects within the video frame so as to provide a more clear video presentation.

The above description is intended by way of example only.

What is claimed is:

1. A method comprising:
   obtaining video frames captured at one or more cameras during a video conference session, wherein each video frame comprises a digital image comprising a plurality of pixels;
   determining depth values associated with each pixel in at least one video frame, wherein each depth value represents a distance of a portion of the digital image represented by at least one corresponding pixel from the one or more cameras that capture the at least one video frame; and
   adjusting luminance values of pixels within captured video frames based upon the depth values determined for the pixels so as to achieve relighting of the video frames as the video frames are displayed during the video conference session.

2. The method of claim 1, wherein the adjusting luminance values of pixels further comprises:
   increasing luminance values for pixels having associated depth values that indicate images associated with the pixels are in a foreground of the at least one video frame, wherein pixels are determined to be in the foreground that have associated depth values that are less than depth values associated with other pixels of the at least one video frame.

3. The method of claim 1, wherein the determining of depth values associated with each pixel further comprises:
   grouping pixels according to the depth values associated with the pixels; and
   determining a maximum and a minimum luminance value for each pixel group;
   wherein the adjusting of luminance values of pixels within captured video frames is based upon pixel groups and the maximum and minimum luminance values determined for each group.

4. The method of claim 3, wherein:
   the grouping of pixels comprises defining depth planes within the at least one video frame such that pixels within the at least one video frame are assigned to the defined depth planes based upon the determined depth values of the pixels; and
   the adjusting luminance values of pixels further comprises adjusting the luminance value of pixels assigned within the same depth plane by the same factor within a range defined by the minimum and maximum luminance values determined for the same depth plane.

5. The method of claim 4, wherein the adjusting luminance values of pixels further comprises:
   adjusting the luminance values for pixels defined within a first depth plane by a greater amount in relation to the luminance values for pixels defined within a second depth plane having an associated depth value that is greater than a depth value associated with the first depth plane.

6. The method of claim 1, further comprising:
   prior to adjusting luminance values of pixels based upon depth values, transforming video frames to high dynamic tone mapped frames.

7. The method of claim 1, wherein the determining depth values associated with each pixel further comprises:
   obtaining depth values for pixels within the at least one video frame using a time-of-flight camera.

8. An apparatus comprising:
   a memory configured to store instructions including one or more video analyzer applications;
   one or more cameras configured to capture video frames during a video conference session, wherein each video frame comprises a digital image comprising a plurality of pixels; and
   a processor configured to execute and control operations of the one or more video analyzer applications so as to:
   determine depth values associated with each pixel in at least one video frame captured by the one or more cameras, wherein each depth value represents a distance of a portion of the digital image represented by at least one corresponding pixel from the one or more cameras that capture the at least one video frame; and
   adjust luminance values of pixels within captured video frames based upon the depth values determined for the pixels so as to achieve relighting of the video frames as the video frames are displayed during the video conference session.

9. The apparatus of claim 8, wherein the processor is further configured to control operations of the one or more video analyzer applications so as to adjust luminance values of pixels by:
   increasing luminance values for pixels having associated depth values that indicate images associated with the pixels are in a foreground of the at least one video frame, wherein pixels are determined to be in the foreground that have associated depth values that are less than depth values associated with other pixels of the at least one video frame.

10. The apparatus of claim 8, wherein the processor is further configured to control operations of the one or more video analyzer applications so as to:
    determine depth values associated with each pixel by grouping pixels according to the depth values associated with the pixels, and determining a maximum and a minimum luminance value for each pixel group; and
    adjust the luminance values of pixels within captured video frames based upon pixel groups and the maximum and minimum luminance values determined for each group.

11. The apparatus of claim 10, wherein the processor is further configured to control operations of the one or more video analyzer applications so as to:
    group pixels by defining depth planes within the at least one video frame such that pixels within the at least one video frame are assigned to the defined depth planes based upon the determined depth values of the pixels; and
    adjust luminance values of pixels by adjusting the luminance value of pixels assigned within the same depth plane by the same factor within a range defined by the minimum and maximum luminance values determined for the same depth plane.

12. The apparatus of claim 11, wherein the processor is further configured to control operations of the one or more video analyzer applications so as to adjust luminance values of pixels by:
    adjusting the luminance values for pixels defined within a first depth plane by a greater amount in relation to the luminance values for pixels defined within a second depth plane having an associated depth value that is greater than a depth value associated with the first depth plane.

13. The apparatus of claim 8, wherein the processor is further configured to control operations of the one or more video analyzer applications so as to:
    prior to adjusting luminance values of pixels based upon depth values, transform video frames to high dynamic tone mapped frames.

14. The apparatus of claim 8, wherein the one or more cameras further comprise at least one time-of-flight camera that obtains depth values for pixels within the at least one video frame.

15. One or more non-transitory computer readable storage media encoded with software comprising computer executable instructions and when the software is executed operable to:
- obtain video frames captured at one or more cameras during a video conference session, wherein each video frame comprises a digital image comprising a plurality of pixels;
- determine depth values associated with each pixel in at least one video frame, wherein each depth value represents a distance of a portion of the digital image represented by at least one corresponding pixel from the one or more cameras that capture the at least one video frame; and
- adjust luminance values of pixels within captured video frames based upon the depth values determined for the pixels so as to achieve relighting of the video frames as the video frames are displayed during the video conference session.

16. The non-transitory computer readable storage media of claim 15, wherein the instructions are further operable to the adjust luminance values of pixels by:
- increasing luminance values for pixels having associated depth values that indicate images associated with the pixels are in a foreground of the at least one video frame, wherein pixels are determined to be in the foreground that have associated depth values that are less than depth values associated with other pixels of the at least one video frame.

17. The non-transitory computer readable storage media of claim 15, wherein the instructions are further operable to determine depth values associated with each pixel by:
- grouping pixels according to the depth values associated with the pixels; and
- determining a maximum and a minimum luminance value for each pixel group;
- wherein the adjusting of luminance values of pixels within captured video frames is based upon pixel groups and the maximum and minimum luminance values determined for each group.

18. The non-transitory computer readable storage media of claim 17, wherein the instructions are further operable to:
- group pixels by defining depth planes within the at least one video frame such that pixels within the at least one video frame are assigned to the defined depth planes based upon the determined depth values of the pixels; and
- adjust luminance values of pixels by adjusting the luminance value of pixels assigned within the same depth plane by the same factor within a range defined by the minimum and maximum luminance values determined for the same depth plane.

19. The non-transitory computer readable storage media of claim 18, wherein the instructions are further operable to adjust luminance values of pixels by:
- adjusting the luminance values for pixels defined within a first depth plane by a greater amount in relation to the luminance values for pixels defined within a second depth plane having an associated depth value that is greater than a depth value associated with the first depth plane.

20. The non-transitory computer readable storage media of claim 15, wherein the instructions are further operable to:
- prior to adjusting luminance values of pixels based upon depth values, transform video frames to high dynamic tone mapped frames.

* * * * *